US008559156B2

(12) United States Patent
Soffa et al.

(10) Patent No.: US 8,559,156 B2
(45) Date of Patent: Oct. 15, 2013

(54) METHOD AND APPARATUS FOR CHARGING OR NEUTRALIZING AN OBJECT USING A CHARGED PIECE OF CONDUCTIVE PLASTIC

(75) Inventors: Michael F. Soffa, Trappe, PA (US); Scott R. McClintock, Kintnersville, PA (US); Michael A. Jacobs, Colmar, PA (US)

(73) Assignee: Illinois Tool Works Inc., Glenview, IL (US)

( * ) Notice: Subject to any disclaimer, the term of this patent is extended or adjusted under 35 U.S.C. 154(b) by 638 days.

(21) Appl. No.: 12/132,390

(22) Filed: Jun. 3, 2008

(65) Prior Publication Data

US 2009/0296305 A1 Dec. 3, 2009

(51) Int. Cl.

| | |
|---|---|
| ***G03G 15/02*** | (2006.01) |
| ***H05F 3/00*** | (2006.01) |
| *H02H 1/00* | (2006.01) |
| *H02H 1/04* | (2006.01) |
| *H02H 3/22* | (2006.01) |
| *H01H 47/00* | (2006.01) |
| *H01F 3/02* | (2006.01) |

(52) U.S. Cl.
USPC .......................................................... 361/225

(58) Field of Classification Search
USPC ................................. 361/225, 212, 220, 222
See application file for complete search history.

(56) References Cited

U.S. PATENT DOCUMENTS 3,632,957 A 1/1972 Hannah
3,968,405 A * 7/1976 Testone ......................... 361/220
4,009,362 A 2/1977 Becker
5,376,425 A 12/1994 Asano et al.
5,468,918 A * 11/1995 Kanno et al. .................. 174/256
5,550,617 A * 8/1996 Odagawa et al. ............. 399/176
5,619,310 A * 4/1997 Todome ........................ 399/381
5,655,188 A 8/1997 Nagamori et al.
6,041,714 A * 3/2000 Trent et al. ................. 105/199.4
6,400,088 B1 * 6/2002 Livingston et al. ............. 315/94
6,590,759 B1 7/2003 Hauser et al.
6,646,853 B2 * 11/2003 Jacobs et al. .................. 361/212
6,748,855 B1 6/2004 Hahne et al.
6,749,669 B1 6/2004 Gay et al.

(Continued)

FOREIGN PATENT DOCUMENTS

CH 659035 A5 12/1986
DE 2754179 A1 8/1979

(Continued)

OTHER PUBLICATIONS

Application Brochure Packaging Industry; SIMCO, An Illinois Tool Works Company; undated; 4 pages.

(Continued)

*Primary Examiner* — Jared Fureman
*Assistant Examiner* — Lucy Thomas
(74) *Attorney, Agent, or Firm* — Panitch Schwarze Belisario & Nadel LLP

(57) ABSTRACT

A method of charging insulative material includes applying a high voltage to a conductive plastic having a uniform resistance throughout. Insulative material is placed in proximity to, or in contact with, the conductive plastic, thereby charging the insulative material. Further, a device for placing charge on an object proximate to the device includes a conductive plastic having a uniform resistance throughout. A high voltage power supply has an output coupled to the conductive plastic.

5 Claims, 11 Drawing Sheets

(56) References Cited

U.S. PATENT DOCUMENTS

| | | | | |
|---|---|---|---|---|
| 6,919,053 | B2 * | 7/2005 | Joannou | 422/186 |
| 2004/0207149 | A1 | 10/2004 | Gammerler et al. | |
| 2007/0029297 | A1 | 2/2007 | Vreeman et al. | |
| 2007/0166207 | A1 * | 7/2007 | Vauge | 422/186.04 |
| 2009/0008493 | A1 | 1/2009 | Frische et al. | |
| 2010/0042180 | A1 * | 2/2010 | Mueller et al. | 607/46 |

FOREIGN PATENT DOCUMENTS

| | | | |
|---|---|---|---|
| DE | 3508514 | A1 | 9/1986 |
| DE | 19713662 | A1 | 10/1998 |
| DE | 10050451 | A1 | 4/2002 |
| DE | 10200404939 | A1 | 9/2004 |
| EP | 0378350 | A2 | 7/1990 |
| EP | 0647526 | A2 | 4/1995 |
| EP | 683034 | A2 | 11/1995 |
| EP | 1285875 | A1 | 2/2003 |
| EP | 1516838 | A2 | 3/2005 |
| EP | 1741652 | A1 | 1/2007 |
| GB | 2028596 | A | 3/1980 |
| JP | 938772 | A | 11/1976 |
| JP | 57190784 | A | 11/1982 |
| JP | 2000183144 | A | 6/2000 |

OTHER PUBLICATIONS

Arc Resistant Pinner Applications; SIMCO, An Illinois Tool Works Company; P/N 5200646 Rev. V; Nov. 2003; 2 pages.

Blue Bar HL Static Bar & Power Supplies for Hazardous Locations; SIMCO, An Illinois Tool Works Company; P/N 5200820 Rev. A; Mar. 2002; 2 pages.

Chargemaster® CM-BP Electrostatic Generating System; SIMCO, An Illinois Tool Works Company; P/N 5200980; Jul. 2007; 2 pages.

Chargemaster CM—DC High Voltage Power Supply; SIMCO, An Illinois Tool Works Company; P/N 5200946; Jun. 2006; 2 pages.

Introducing Chargemaster® Electro Static Charging Systems CM20 CM30 CM60; SIMCO, An Illinois Tool Works Company, PN 5200947; Jun. 2006; 4 pages.

More About Conductive (UHMW) Polyethylene; McMaster-Carr Supply Company; Document 8826KAC; 2000; 2 pages.

PerforMAX Static Neutralizing System; SIMCO, An Illinois Tool Works Company; undated; 1 page.

PerforMAX Static Neutralizing System Components; SIMCO, An Illinois Tool Works Company; P/N 5200818; Jan. 2002; 1 page.

Pinner™ Superbar Charging Applicator; SIMCO, An Illinois Tool Works Company; P/N 5200776; Mar. 2000; 2 pages.

Solutions for Injection Molding In-Mold Labeling; SIMCO, An Illinois Tool Works Company; undated; 2 pages.

Product Specification: TETRA™ Electrostatic Generating Charging Bar; Simco, An Illinois Tool Works Company; PN 5200576; 1994; 2 pages.

European Search Report dated Sep. 10, 2010 for counterpart EP Appln. No. 091555584.7, published Sep. 10, 2010, 3 pages.

European Search Report for EP 06076369, published Jan. 10, 2007 in EP Appln. No. 1741652 A1, 3 pages.

European Search Report for EP 01810073, published Feb. 2, 2003 in EP Appln. No. 1285875 A1, 3 pages.

EP Office Action for Application No. 091555847-1253, issued Sep. 30, 2010, 5 pages.

* cited by examiner

METHOD AND APPARATUS FOR CHARGING OR NEUTRALIZING AN OBJECT USING A CHARGED PIECE OF CONDUCTIVE PLASTIC

BACKGROUND OF THE INVENTION

Embodiments of the present invention relate generally to devices for charging objects and static control devices, and more particularly to the use of certain materials in charge application and static neutralization processes.

In many manufacturing, processing, and packaging systems, it is desirable to place a charge on an object (often referred to as "pinning" an object) to aid in the proper stacking or alignment of various objects. For example, when stacking catalogs at the end of a conveyer, it is difficult to arrange for each of the catalogs to maintain its position so that the catalogs are positioned in a tight, vertically registered stack. The proper alignment of the catalogs is easier to maintain when a charge is placed on each of the catalogs. The tendency of charged catalogs to "stick" together facilitates transporting a stack of catalogs to another location for strapping and/or shrink-wrapping without catalogs slipping from the stack or becoming otherwise misaligned. Maintaining the catalogs in a properly aligned stack prevents damage to misaligned catalogs during the shrink-wrapping or strapping process.

It can also be useful to place a charge on ribbons that are to be tacked together. When two ribbons are being processed so as to overlay each other, it is common for air to become trapped between the ribbons. By placing a static charge on the ribbons, air that is disposed between the ribbons can be displaced which helps prevent "dog ears" and creases in the tacked ribbons. In a similar fashion, placing a charge on a web can be used to firmly position the web on a roller and to reduce slippage between the web and the roller.

Conventional ionizing devices utilize one or more rows of pins to introduce ions into the surrounding gas (such as air) and form a layer on one side of an object. Such conventional devices have several drawbacks. For example, since the ambient gas (e.g., air) is the medium for transporting the ions, energy stored on the object may be affected by ambient temperature, relative humidity, and turbulence. This may be especially true for less mobile positive ions. Additionally, dust and debris may accumulate in the charging devices, thereby contaminating and reducing the long-term efficiency thereof. Further, the pins suffer from high erosion rates due to electron bombardment. The ions attach themselves to particles in the gas, causing debris to pelt the pins, particularly when no object is in proximity to the pins for charging. The pins may also erode quickly due to corrosive contaminate build-up caused by electric fields that are created around the pins as a result of the ion generation process. Pin erosion can lead to uneven charge application and equipment malfunction. The common solution is to manufacture the pins out of harder materials, but the pin material merely slows rather than prevents erosion.

The pins themselves can also contribute to uneven charge distribution. Sharper pins produce more electrons. Pins may additionally have disparate resistances, ranging up to differences of 20% between adjacent pins. As a result, one pin sees another as a load and an uneven charge distribution develops as less ions move to the gas in the vicinity of the pin disparities.

It is therefore desirable to provide an ionizing device that can apply a charge to an object without being susceptible to environmental variations and can provide a more evenly distributed ion field while still being capable of installation into existing equipment, such as conveyors.

In certain other manufacturing, processing, and packaging systems, it is undesirable to have charge on an object. For example, a variety of processes involve the use of webs that are wound, unwound and/or rewound. Frictional contact between the web and rotating or stationary members and guide devices may cause an accumulation of both positive and negative static charges on the web. Some webs, for example, paper webs, readily accept and hold static charges. Build-up of static charges in the web can impact equipment or process performance and functionality and web charges may cause attraction or repulsion of the web from transport surfaces, interfering with proper transport and direction of the web through the process equipment.

Further, electrostatic charges under such circumstances may present significant hazards to operator safety, product quality, and electronic process control. If the charge level on the roll or web reaches a critical limit, a spark can occur, arcing to nearby conductive objects. Critical electronic components may suffer costly damages, and nearby personnel may be injured.

It is therefore desirable to provide a device that can more effectively dissipate the static charge on a passing object.

BRIEF SUMMARY OF THE INVENTION

Briefly stated, various embodiments of the present invention comprise a method of charging insulative material. The method includes applying a high voltage to a conductive plastic having a uniform resistance throughout. Insulative material is placed in proximity to, or in contact with, the conductive plastic, thereby charging the insulative material.

Further embodiments of the present invention comprise a method of using a conductive plastic having a uniform resistance throughout as a charge applicator. The method includes charging the conductive plastic with a high voltage. The conductive plastic is used to apply a charge to an object.

Still further embodiments of the present invention comprise a method of using a conductive plastic having a uniform resistance throughout as an electrostatic neutralizing device. The method includes applying one of a high voltage alternating current (AC) power supply and a high voltage bipolar power supply to the conductive plastic. The conductive plastic is placed in proximity to an object, thereby dissipating a static charge on the object.

Further embodiments of the present invention comprise a device for placing charge on an object proximate to the device. The device includes a conductive plastic having a uniform resistance throughout. A high voltage power supply has an output coupled to the conductive plastic.

Still further embodiments of the present invention comprise a device for placing charge on an object proximate to the device. The device includes a conductive plastic having a uniform resistance throughout. The conductive plastic has at least one beveled edge.

Further embodiments of the present invention comprise a method of placing charge on an object proximate to the device. The method includes providing a blank of conductive plastic having a uniform resistance throughout and beveling at least one edge of the conductive plastic blank. A high voltage is applied to the conductive plastic blank. The object is placed in proximity to the at least one beveled edge of the conductive plastic blank.

Still other embodiments of the present invention comprise a device for placing charge on an object proximate to the device. The device includes a conductive plastic having uniform resistance throughout. A metal plating layer is disposed on at least a portion of the conductive plastic.

Further embodiments of the present invention comprise a method of placing charge on an object. The method includes providing a blank of conductive plastic having a uniform resistance throughout. A metal plating layer is deposited on at least a portion of the conductive plastic blank. A high voltage is applied to the conductive plastic blank. The object is placed in proximity to the conductive plastic blank.

Still further embodiments of the present invention comprise a device for placing charge on an object proximate to the device. The device includes a layer of a conductive plastic having a uniform resistance throughout. At least one layer of an additional material is in electrical communication with the layer of the conductive plastic.

Still other embodiments of the present invention comprise a device for placing charge on an object proximate to the device. The device includes a layer of conductive plastic having a uniform resistance throughout and at least one layer of a substrate material. The conductive plastic layer is disposed on the substrate layer.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
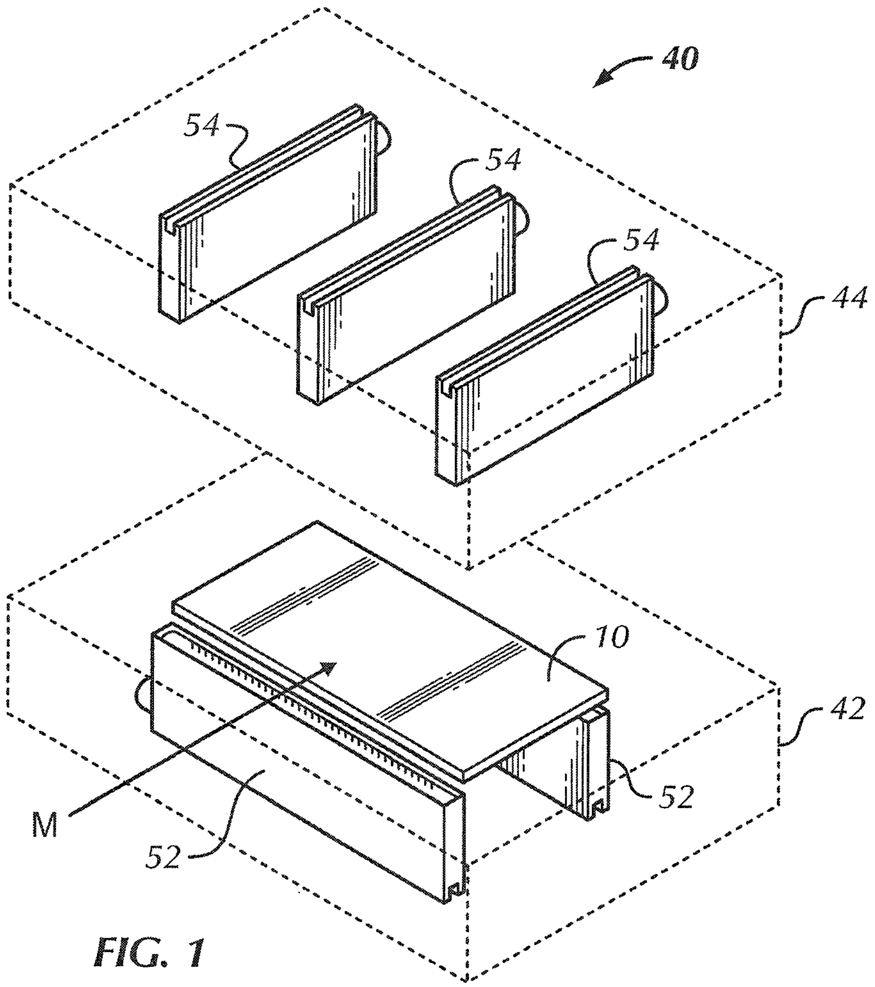
FIG. 1 is a schematic view of a charging tunnel implemented with a conductive plastic device in accordance with a preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the amusement device and designated parts thereof. The terminology includes the above-listed words, derivatives thereof, and words of similar import. Additionally, the words "a" and "an", as used in the claims and in the corresponding portions of the specification, mean "at least one."

"In proximity to" is used in the claims and in corresponding portions of the specification to describe the passing of an object into the ionized area proximate to the device. "In proximity to" is used instead of terms that imply a specific orientation, such as "over" or "under" because depending on the specific structure with which the device is used (and depending on the orientation of the ion emitting surface of the device), the object may pass over the device, pass under the device, or pass along a lateral side of the device. "In proximity to" accurately describes the passing of the object through the ionized area proximate to the surface of the device regardless of the specific orientation of the device relative to the object. The above mentioned terminology includes the words above specifically mentioned, derivatives thereof and words of similar import.

Figure 3:
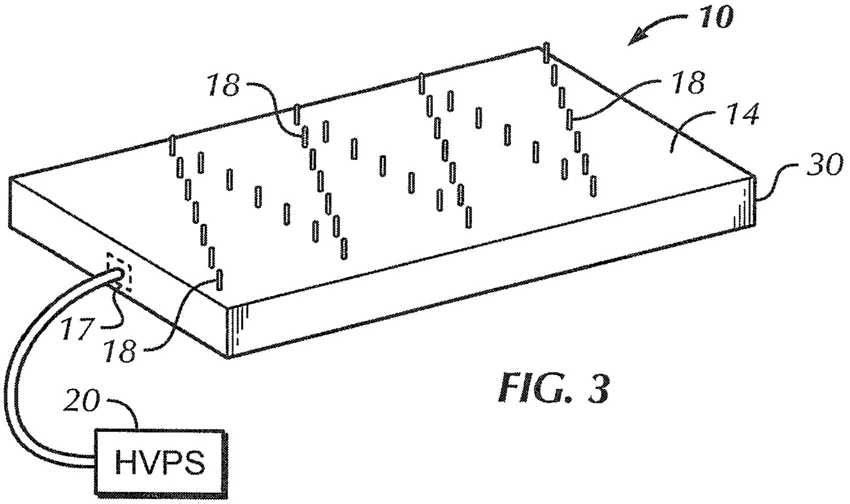
FIG. 3 is a perspective view of a conductive plastic device in accordance with a preferred embodiment of the present invention.

Referring to the drawings in detail, wherein like reference numerals indicate like elements throughout, there is shown in FIG. 1 a first preferred embodiment of a device 10 for placing charge on an object (e.g., element 112 in FIG. 4) brought in proximity to or in contact with the device 10. Referring to FIG. 3, the device 10 includes a body 12 comprised of a conductive plastic having a uniform electrical resistance throughout the body 12. The conductive plastic body 12 preferably provides about 1 Mega-ohm (MΩ) of resistance. In preferred embodiments, the conductive plastic body 12 is an ultra-high molecular weight (UHMW) polyethylene material. For example, the UHMW polyethylene material may preferably have a dielectric strength of about 450-500 Volts/milli-inch (V/mil). Other materials may be used for the body 12 of the device 10, provided the resistance is uniform throughout. For example, the body 12 may be comprised of an amount of carbon fill or carbon nanotubes. The material is also preferably injection moldable for forming different geometries and distinct features.

Figure 2:
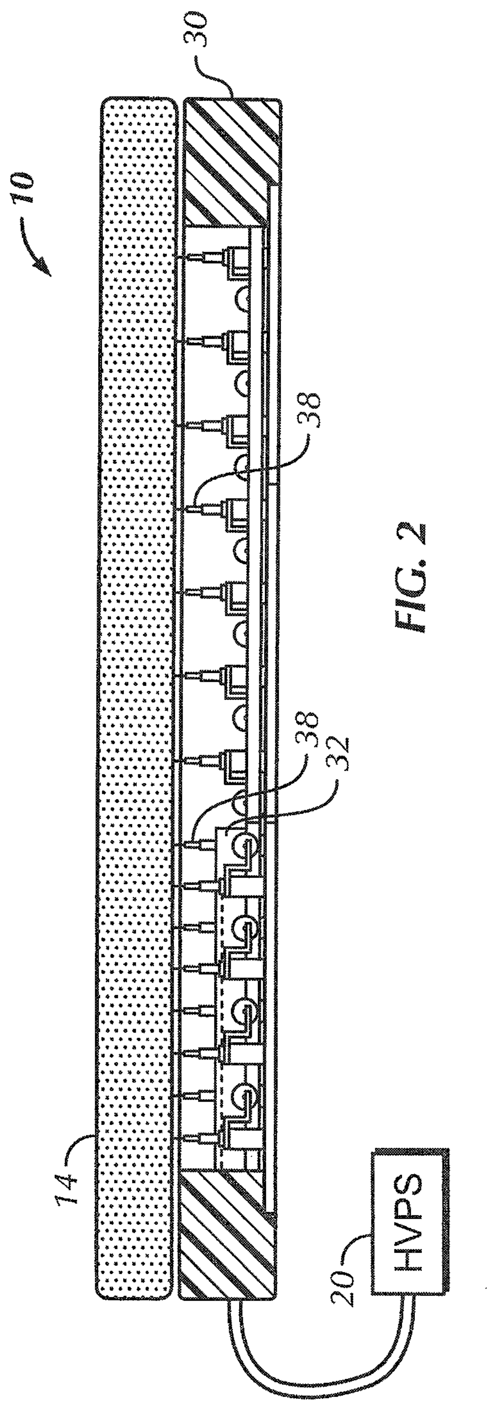
FIG. 2 is a cross-sectional side elevational view of a conductive plastic device arranged in accordance with a preferred embodiment of the present invention.

Referring to FIGS. 2 and 3, in certain preferred embodiments of the present invention, a surface 14 of the device 10 has a generally rectangular shape. However, the surface 14 may be circular, hexagonal, irregularly shaped, or the like when viewed in a top plan view. The surface 14 may be flat and smooth, as shown in FIG. 2, or may include a plurality of ionizing pins 18 disposed thereon. The pins 18 may be punched, embedded, threaded, socket-based, or molded into the body 12 as desired to obtain electrical charge from the device 10. Alternatively, the pins 18 may monolithically formed in one piece with the conductive plastic 10 (i.e., the pins 18 and body 12 are formed as one piece of the conductive plastic) through injection molding or the like. The pins 18 may be arranged in patterns as desired, such as multiple rows, columns, diagonals, saw-tooth, S-curves, or the like. A charge is placed onto an object from an ion field generated at the surface 14 of the device 10. The object may be placed in proximity to, or in contact with, the surface 14 to apply the charge.

Figure 12:
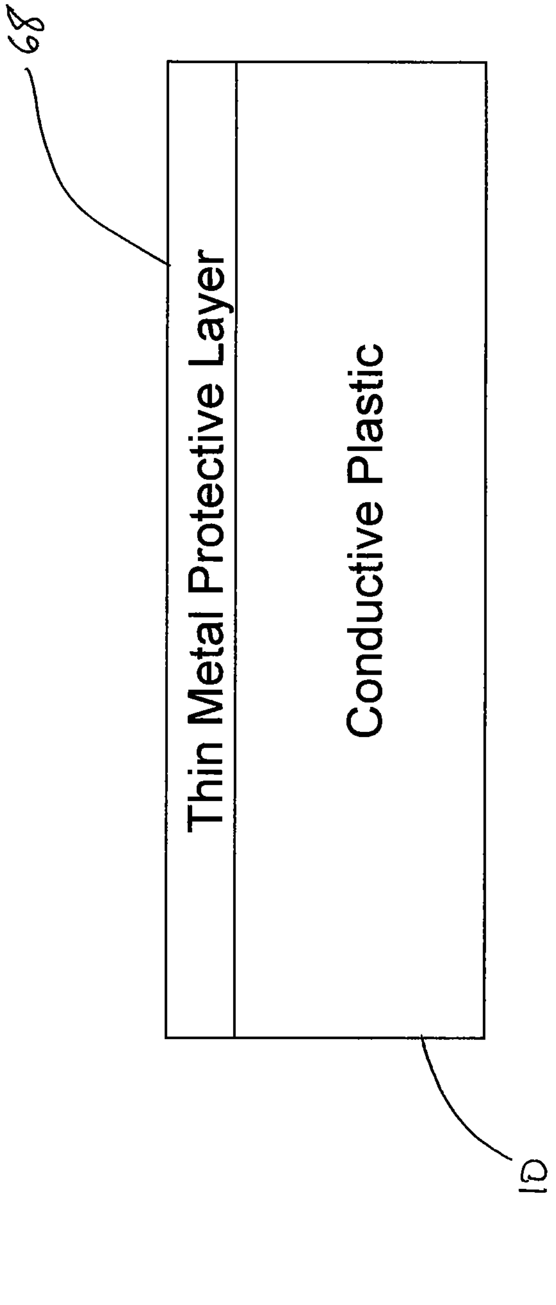
FIG. 12 is a schematic view of a conductive plastic device having a thin metal layer disposed thereon in accordance with a preferred embodiment of the present invention.

To prevent erosion of the body 12 of the device 10, particularly at edges of the surface 14, a part or all of the body 12 may be plated. For example, a thin conductive layer (e.g., metal) 68 (FIG. 12) may be deposited, grown, or bonded to at least a portion of the body 12 of the device 10. In preferred embodiments, the device 10 is placed in a vacuum chamber and the metal layer is deposited by sputtering, such that the metal bonds molecularly with the plastic body 12. The metal may comprise chrome, titanium, stainless steel, or the like, including combinations of metals.

Figure 9:
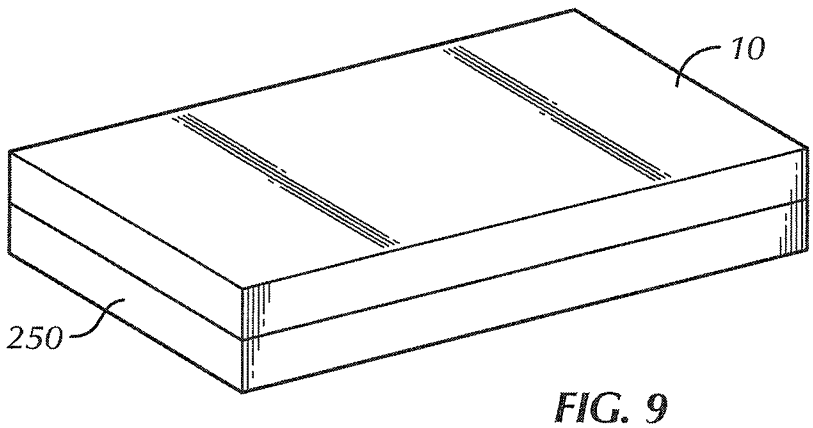
FIG. 9 is a perspective view of a conductive plastic device disposed on an additional material layer in accordance with a preferred embodiment of the present invention.
Figure 10:
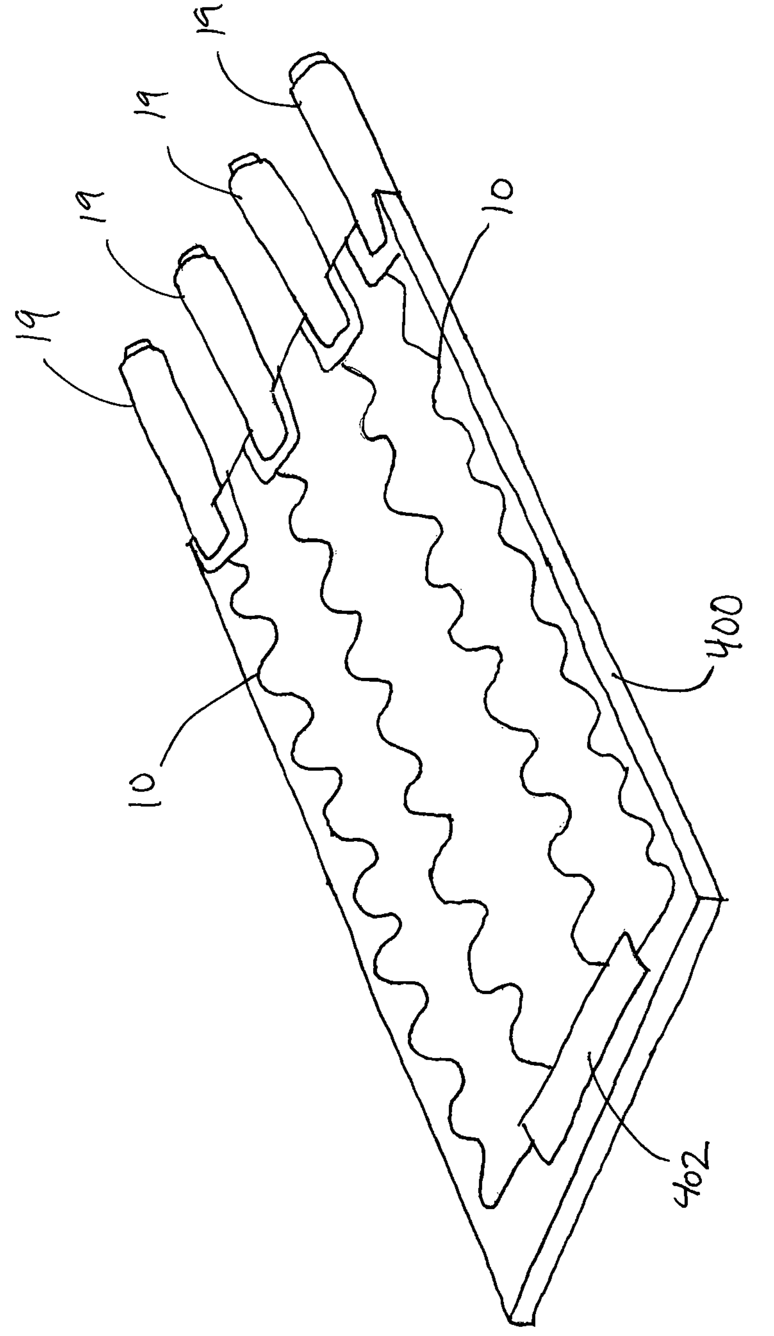
FIG. 10 is a perspective view of a substrate having conductive plastic disposed thereon in accordance with a preferred embodiment of the present invention.

For use in charging applications, the device 10 must be configured to receive a high voltage. In one preferred embodiment, the device 10 is in proximity to, or in contact with, a current-limited ion source (FIG. 2), such as a conventional ionizer 30 as described in commonly owned U.S. Pat. No. 6,590,759 B1, which is incorporated by reference herein. One such ionizer is the Pinner™ Superbar Charging Applicator, commercially available from SIMCO Industrial Static Control. The conventional ionizer 30 includes a plurality of pins 38 that are directed toward or may contact the body 12 of the conductive plastic device 10 to transfer the charge from a high voltage power supply (HVPS) 20. The HVPS 20 is connected to the ionizer 30 via a power input 32. In certain other embodiments, the conductive plastic device 10 may be disposed on one or more additional conductive layers 250 (see FIG. 9). Charge would therefore be transferred to the conductive plastic device 10 through the one or more layers 250. In still further embodiments, the conductive plastic 10 may be disposed on a substrate 400 (see FIG. 10). Substrate 400 includes a contact 402 which transfers charge to lines of conductive plastic 10, which function as resistors as the current is directed toward sockets 19 for receiving pins 18.

Figure 5:
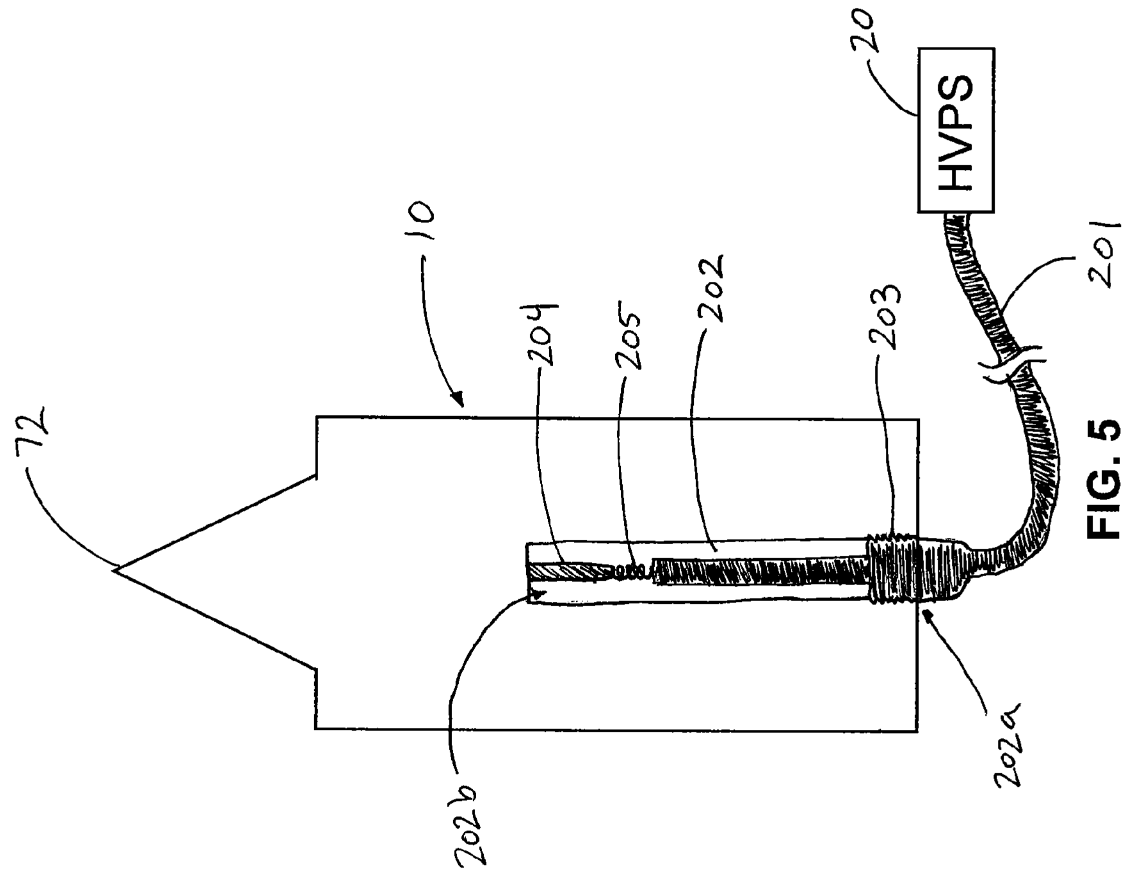
FIG. 5 is a schematic view of a beveled conductive plastic device coupled to a high voltage power supply in accordance with a preferred embodiment of the present invention.

In another more preferred embodiment, an output of a the HVPS 20 is coupled directly to the conductive plastic body 12 (e.g., FIG. 3) for charging the device 10. FIG. 5 shows a more detailed illustration of one preferred method of connecting the HVPS 20 to the body 12. A high voltage cable 201 coupled to the HVPS 20 is inserted into a cavity 202 in the body 12 and is held in place by a threaded portion 203 proximate cavity opening 202*a*. A resistor 204 abuts the body 12 at a cavity distal end 202*b*. The resistor 204 is utilized to reduce the current flow in the body 12, thereby preventing a shock hazard. The resistor 204 is preferably in the range of about 250 MΩ up to about 1 Giga-Ω (GΩ). As a safety precaution, two or more resistors 204 may be utilized in the event that one of the resistors fails. Although the resistor 204 is shown in FIG. 5 as being of the axial-type, the resistor 204 may also be of one or more surface mounted-type.

A spring contact 205 at the end of the high voltage cable 201 connects the HVPS 20 to the resistor 204, the charge being transferred to the body 12 via the abutment with the resistor 204. The contact 205 need not be a spring, and may be of any conventional type, such as a prong, a ring, or a threaded-type. The remainder of the cavity 202 may be potted with a material of high dielectric to prevent inadvertent touching of the body 12 with the contact 205. In one preferred embodiment, the spring contact 205 may directly connect to the body 12. For example, when the body 12 comprises carbon nanotubes, the body 12 can be set to a high enough resistance to dissipate the current itself. In such embodiments, an internal resistor 204 is not necessary. In another preferred embodiment, the conductive plastic device 10 may include an external contact 17 (shown schematically in FIG. 3) configured to receive the output from the HVPS 20.

The HVPS 20 preferably is capable of supplying a voltage of between ±30 kiloVolts (kV)-±60 kV on direct current (DC). The HVPS 20 also preferably provides a current of between 2.5 milliAmperes (mA)-5 mA DC for an output power of about 150 Watts (W). The HVPS 20 preferably may be powered by inputs of about 85 V-264 V at 47 Hertz (Hz)-63 Hz of alternating current (AC). Alternatively, the HVPS 20 could be powered by a 24 V input source. An example of such an HVPS is the Chargemaster®, commercially available from SIMCO Industrial Static Control. However, the HVPS 20 may utilize or operate with higher or lower voltages and currents without deviating from the present invention.

Figure 11:
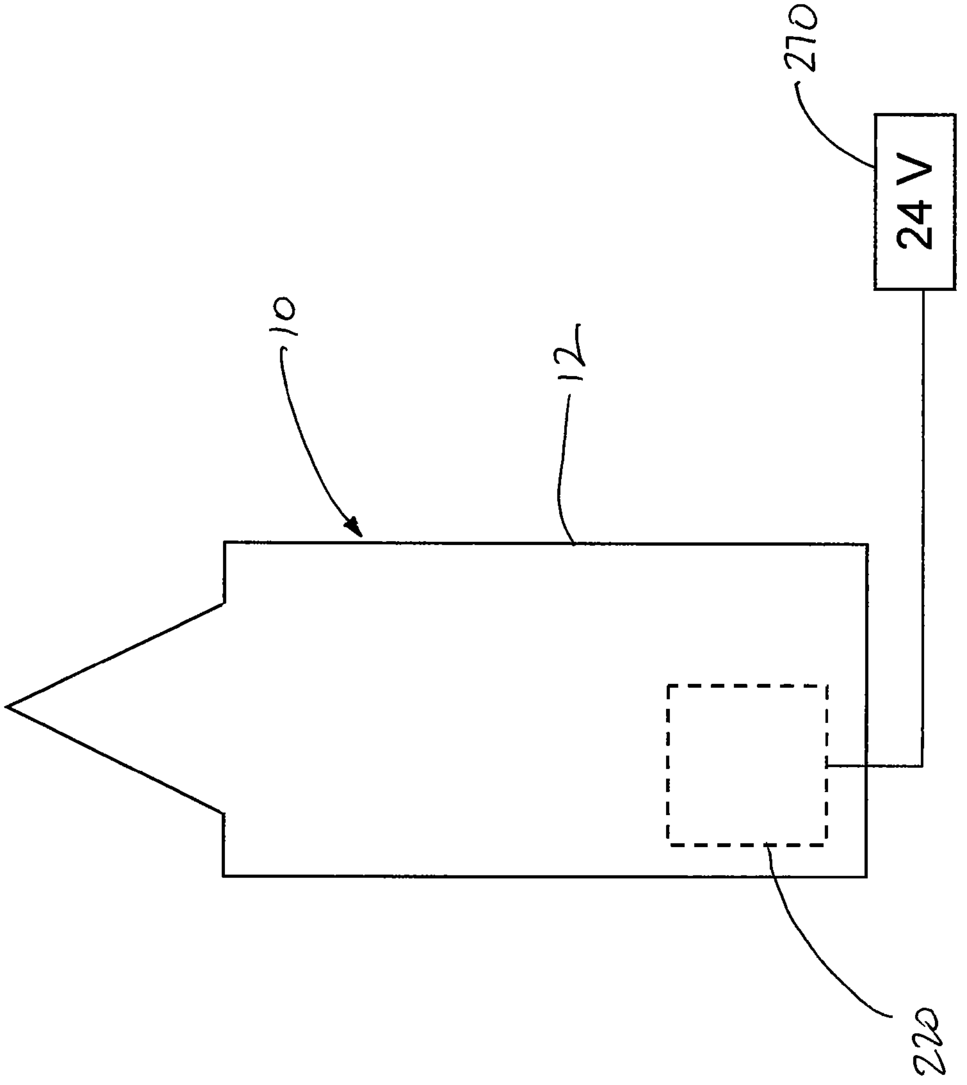
FIG. 11 is a schematic view of a beveled conductive plastic device having an embedded high voltage power supply in accordance with a preferred embodiment of the present invention.

In one preferred embodiment, an HVPS 220, shown in phantom in FIG. 11, may be embedded within the body 12 of the device 10. An embedded HVPS 220 eliminates the requirement of a high voltage cable, requiring only a minimal power input, such as connection to a 24 V DC power supply 270. The embedded HVPS 220 includes components of the conventional HVPS 20, including an oscillator and a transformer. With either an external HVPS 20 or internal HVPS 220, a charging monitor (not shown), as described in commonly owned U.S. Pat. No. 6,646,853, the contents of which are hereby incorporated by reference, may also be utilized to control the current of the HVPS 20, 220.

Returning to FIG. 1, the conductive plastic device 10 is shown being implemented in a “charging tunnel” 40 application. An object (not shown) to be charged passes between a lower housing 42 and an upper housing 44 of the charging tunnel 40 along a direction indicated by arrow M. The conductive plastic device 10 is preferably disposed in the lower housing section 42 along with several lower charging devices or bars 52, which may supply the charge to the conductive plastic device 10. An example of a suitable bar 52 is a Pinner™ Bar, commercially available from SIMCO Industrial Static Control. The high voltage supplied to the conductive plastic device 10 is preferably a positive high voltage, as positive ions are less mobile, and typically an object proceeding through the charging tunnel 40 is on a conveyor (FIG. 4) and passes closer to the lower housing section 42. The upper housing section 44 includes several upper charging devices, such as ionizing bars 54 having negative polarity. As an object, which is typically insulative, passes through the charging tunnel 40, a side of the object passing proximate the lower housing section 42 will be charged by positive ions emitted from the surface 14 of the conductive plastic device 10 and a side of the object passing proximate the upper housing section 44 will be charged by negative ions.

One preferred charging configuration has the following specifications: (1) The lower housing 42 includes two arc resistant charging bars 52, each measuring approximately 15"×18", provided with 50 kV (positive polarity). The charging bars 52 are mounted orthogonally to the conveyor motion direction M. (2) The conductive plastic device 10 preferably measures 5"×19" and is mounted above the bars 52. (3) The upper housing section 44 preferably includes four arc resistant charging bars 54 provided with 30 kV (negative polarity). Each bar 54 measures 6"×9" and is mounted parallel to the conveyor motion direction M. The voltage supplied to the upper bars 54 may be adjusted based on the height of a stack of objects. (4) Side blocking plates (not shown) made of a nonconductive material, such as polycarbonate, may be provided.

Figure 4:
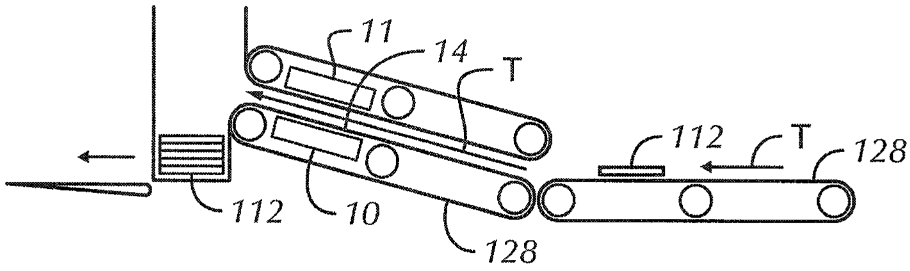
FIG. 4 is a schematic view of a conveyor retrofitted to include a conductive plastic device in accordance with a preferred embodiment of the present invention.

FIG. 4 shows a conductive plastic device 10 utilized in an alternate configuration, wherein the device 10 is retrofitted to a belt conveyor 128 to place a charge on an object 112, such as a magazine, being transported in direction T on the belt conveyor 128. The belt conveyor 128 preferably has a portion moving in the direction T for supporting and transporting the object 112. While the preferred embodiment of the conveyor 128 is an endless belt conveyor, the conductive plastic device 10 may alternately be used with a pallet transport system, an O-ring conveyor, a drag type conveyor, a sheet conveyor, a pneumatic conveyor, a roller conveyor, a chain conveyor, or with other transport or conveyor systems.

The device 10 is preferably oriented so that the surface 14 faces the portion of the conveyor 128 moving in the direction T to allow the device 10 to place the charge on the object 112 being transported by the belt conveyor 128. In applications utilizing a thick transport belt, it is preferable to utilize a flat surface 14 without pins 18 in order to more quickly drive the charge. FIG. 4 also shows the use of an upper ionizer 11, which may be one or more charge bars as shown in FIG. 1, a conventional ionizer 30 as shown in FIG. 2, or may even be a second conductive plastic device 10. Alternatively, device 10 and/or ionizer 11 may comprise a combination of such as shown in FIGS. 1 and 2 (e.g., a conductive plastic device 10 in combination with a conventional ionizer 30).

In addition to use in catalog packaging, charging embodiments of the present invention may be used for applications such as in mold decorating, bagmaking, card inserting for perfect bound or saddle stitched pages, shrink wrapping, chill roll edge pinning, roll-to-roll changeover, and binder covers.

Figure 8:
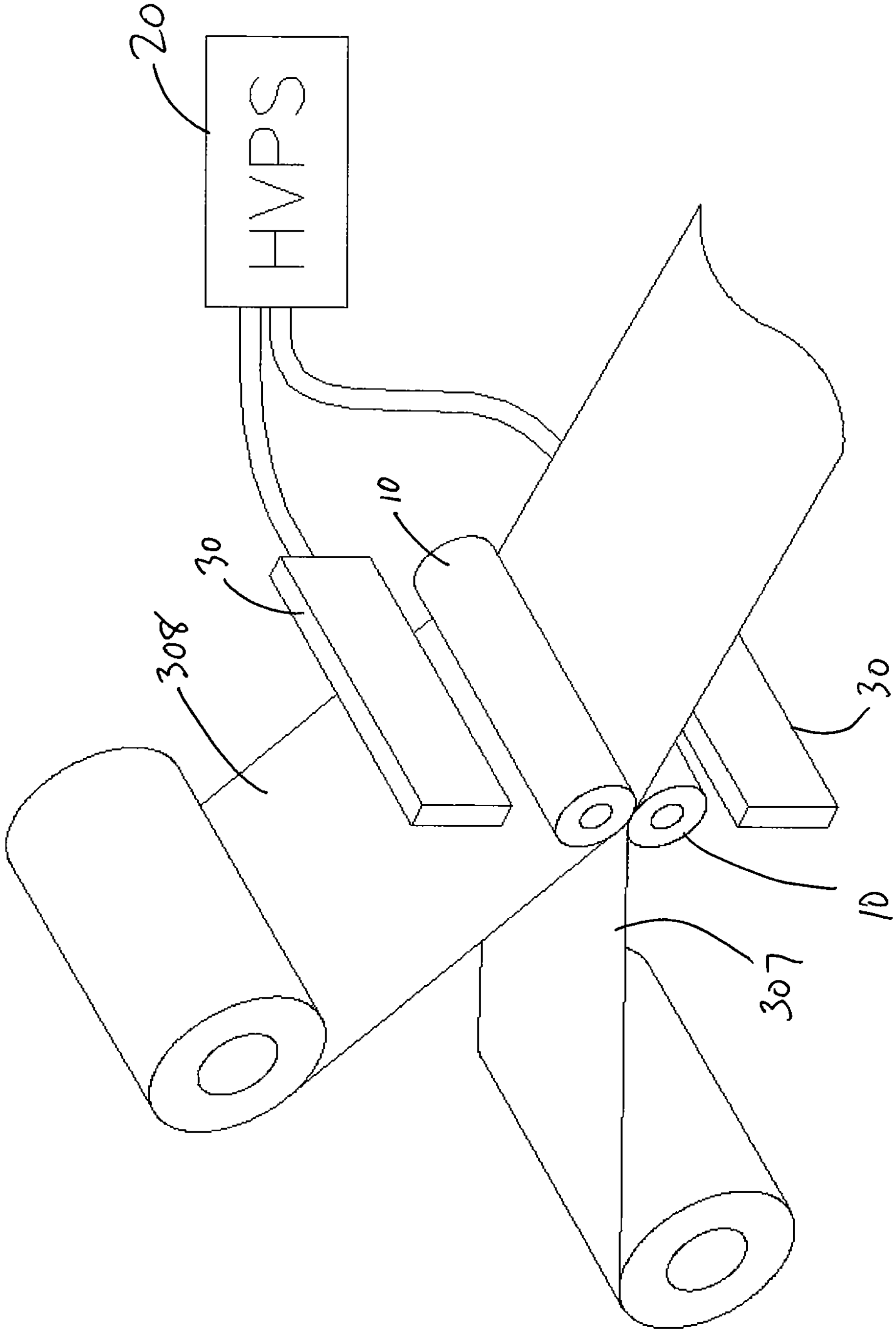
FIG. 8 is a schematic view of a conductive plastic device formed as a roller in accordance with a preferred embodiment of the present invention.

In certain preferred embodiments, it may be advantageous to utilize the conductive plastic device 10 in the form of one or more rollers (see FIG. 8). An exemplary application includes interleaving of a base material 307 with a protective layer 308. The conductive plastic rollers 10 pin the protective sheet 308 to the base material 307 to hold in position during shearing and stacking processes. Another potential application includes dry bonding web/sheet lamination.

Referring to FIG. 5, it may be advantageous for certain applications to present a beveled edge 72 of the conductive plastic device 10 to the object to be charged. The beveled edge 72 functions similar to a sharp pin for ionizing ambient gas. A device 10 utilizing a beveled edge 72 may be substituted, for example, in place of a traditional bar 52 (FIG. 1). The continuous characteristic of the beveled edge 72 permits a more uniform charge distribution than a row of pins. However, the device 10 may be formed, through injection molding, for example to include a row of pins or other geometries to present sharp features. The device 10 as shown in FIG. 5 may be formed by taking a blank of the conductive plastic and beveling one or more edges 72 as needed by any conventional technique for cutting, sanding, etching, or the like. Alternatively, the beveled edge 72 may be formed by injection molding or the like.

Figure 6:
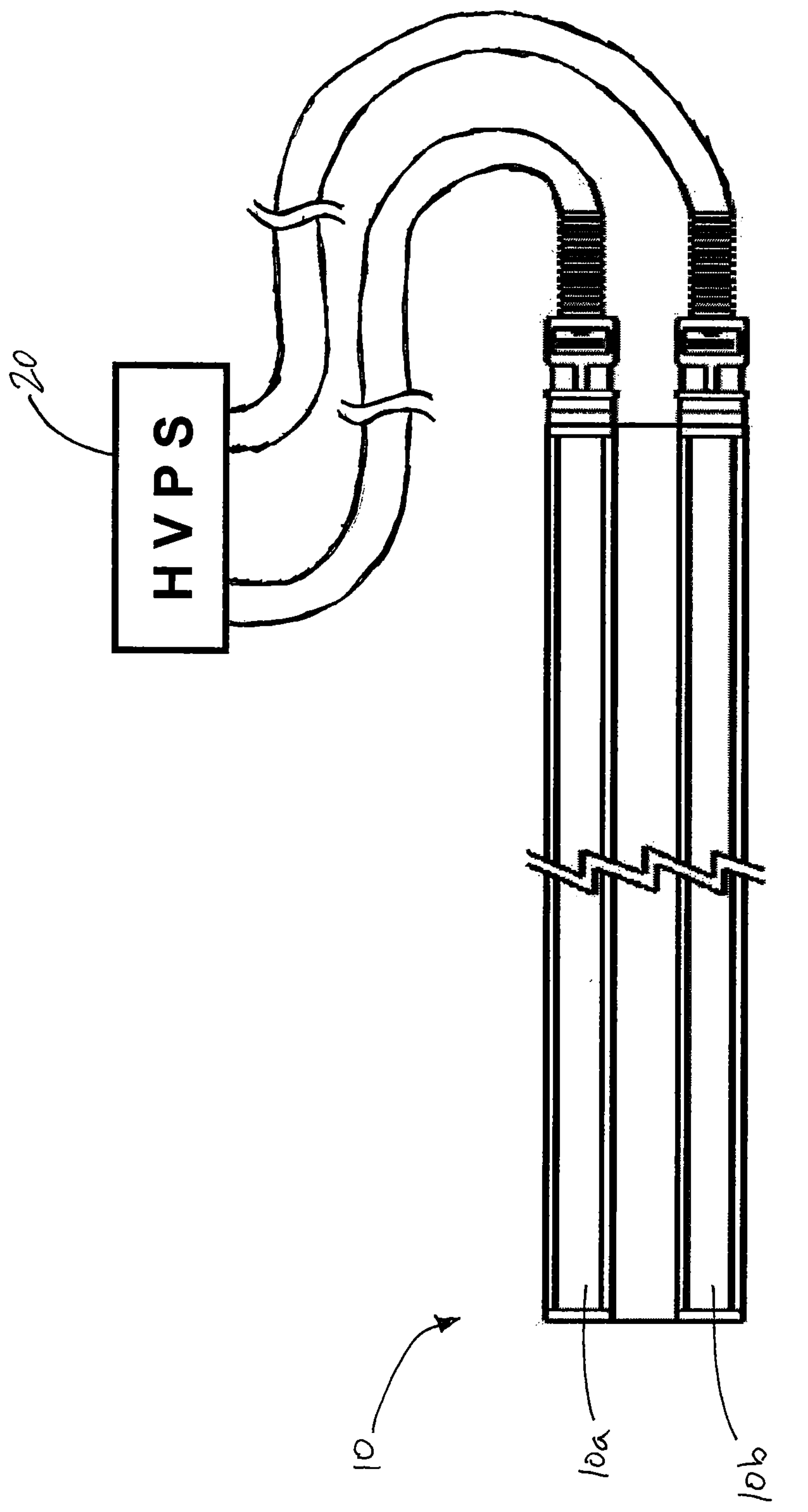
FIG. 6 is a schematic view of a conductive plastic device for use in neutralizing applications and coupled to a bipolar power supply in accordance with a preferred embodiment of the present invention.
Figure 7:
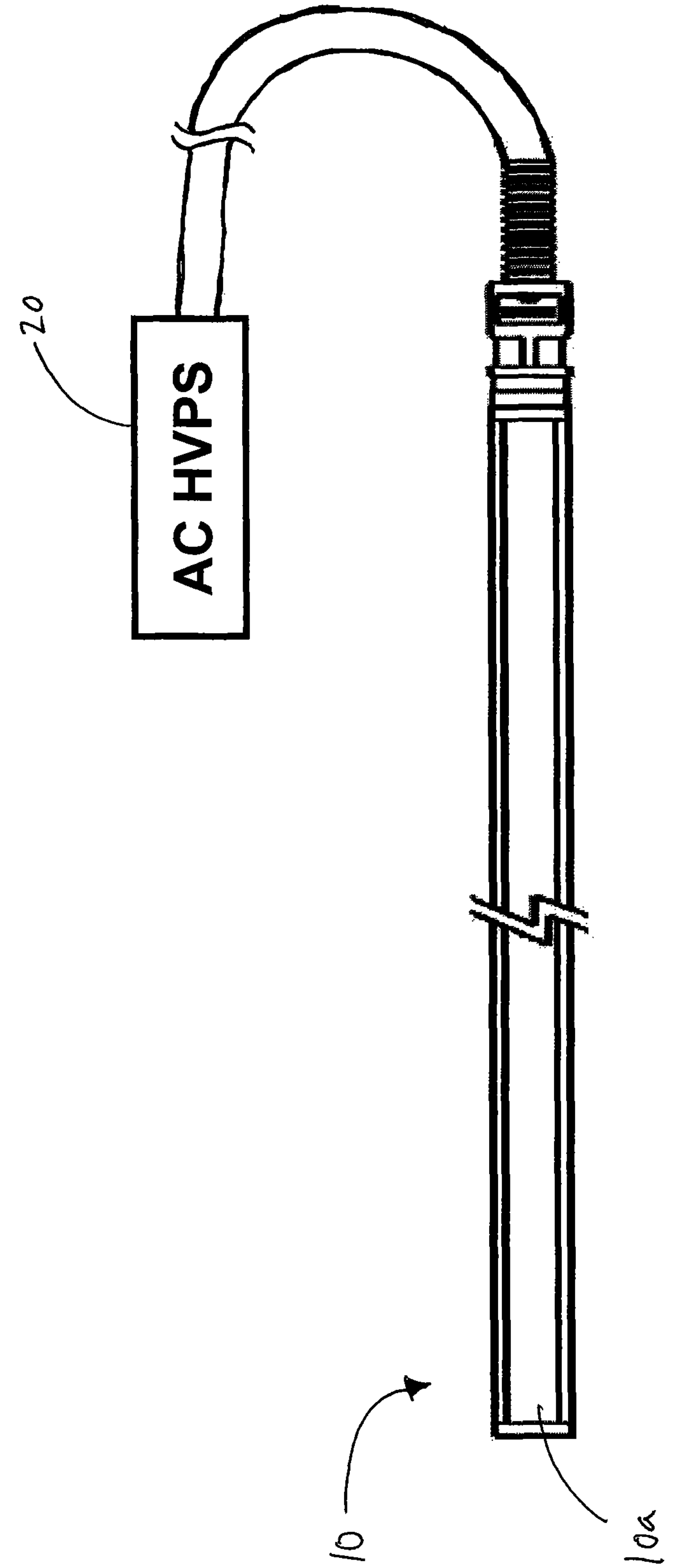
FIG. 7 is a schematic view of a conductive plastic device for use in neutralizing applications and coupled to an alternating current (AC) power supply in accordance with a preferred embodiment of the present invention.

Referring to FIGS. 6 and 7, in another embodiment of the present invention, the conductive plastic device 10 may be used for static neutralization applications. Such applications involve applying a high voltage bipolar power supply 20 (FIG. 6) or a high voltage AC power supply 20 (FIG. 7) to the conductive plastic device 10. The device 10 then serves to create an ion field in proximity to an object (not shown) in order to remove the static charge from the object. In the embodiment shown in FIG. 6, the conductive plastic device 10 is divided into two rows 10*a*, 10*b*. One row 10*a*, for example, produces positive ions and the other row 10*b*, for example, produces negative ions, depending on the connections to the bipolar power supply 20. In the embodiment shown in FIG. 7, the device 10 forms only one row 10*a* and is connected to the AC power supply 20 and alternates between positive and negative ion emissions. The device 10 may be formed or shaped in any manner described above with respect to charging applications.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of using a conductive plastic having a uniform resistance throughout as a non-contact charge applicator, the conductive plastic including at least one beveled edge, the method comprising:

(a) charging the conductive plastic with a high voltage of at least ±30 kV from a power supply embedded in the conductive plastic;

(b) generating an ion field at the at least one beveled edge; and (c) placing an object in proximity to the at least one beveled edge of the conductive plastic and within the ion field to apply a charge to the object.

2. A method of using a conductive plastic having a uniform resistance throughout as a non-contact electrostatic neutralizing device, the conductive plastic including at least one beveled edge, the method comprising:

(a) applying one of a high voltage alternating current (AC) power supply or a high voltage bipolar power supply to the conductive plastic, the high voltage alternating current (AC) power supply or the high voltage bipolar power supply being embedded in the conductive plastic; and (b) placing the at least one beveled edge of the conductive plastic in proximity to an object, thereby dissipating a static charge on the object.

3. The method of claim 2, wherein the conductive plastic is comprised of carbon nanotubes.

4. The method of claim 2, wherein the conductive plastic is comprised of carbon fill.

5. A method of placing or removing charge on an object, the method comprising:

(a) providing a blank of conductive plastic having a uniform resistance throughout;

(b) beveling at least one edge of the conductive plastic blank;

(c) applying one of a high voltage alternating current (AC) power supply or a high voltage bipolar power supply to the conductive plastic blank, the high voltage alternating current (AC) power supply or the high voltage bipolar power supply being embedded in the conductive plastic; and (d) placing the object in proximity to the at least one beveled edge of the conductive plastic blank.

* * * * *